(12) United States Patent
Downs

(10) Patent No.: US 7,269,124 B2
(45) Date of Patent: Sep. 11, 2007

(54) PROTECTIVE DIVIDER AND ENCLOSURE DISC ASSEMBLY FOR LASER DISCS AND LASER DISC DRIVES

(76) Inventor: Thomas Paul Downs, P.O. Box 3191, Beverly Hills, CA (US) 90212

(*) Notice: Subject to any disclaimer, the term of this patent is extended or adjusted under 35 U.S.C. 154(b) by 84 days.

(21) Appl. No.: 11/154,166

(22) Filed: Jun. 15, 2005

(65) Prior Publication Data
US 2005/0233105 A1    Oct. 20, 2005

Related U.S. Application Data

(63) Continuation-in-part of application No. 09/909,087, filed on Jul. 20, 2001, now abandoned.

(51) Int. Cl.
G11B 23/03 (2006.01)
B65D 85/57 (2006.01)

(52) U.S. Cl. .................. 369/291.1; 206/308.1

(58) Field of Classification Search ............. 206/308.1, 206/309–313; 428/64.1, 66.7; 720/708, 720/720, 724, 616, 719; 369/291.1; 162/157.1–157.3, 162/141, 146, 148–149, 125, 129–130
See application file for complete search history.

(56) References Cited

U.S. PATENT DOCUMENTS

| | | | | |
|---|---|---|---|---|
| 1,320,958 A * | 11/1919 | Albrecht et al. | ......... | 369/291.1 |
| 1,683,440 A * | 9/1928 | Bodwell et al. | ......... | 369/272.1 |
| 3,854,729 A * | 12/1974 | Downs | .................... | 369/272.1 |
| 4,276,636 A * | 6/1981 | Morgan et al. | .......... | 369/272.1 |
| 4,316,281 A * | 2/1982 | Prusak | ........................ | 206/309 |
| 4,413,298 A * | 11/1983 | Pecsok et al. | .............. | 206/313 |
| 4,520,470 A * | 5/1985 | d'Alayer de Costemore d'Arc | ..... | 206/308.1 |
| 4,586,606 A * | 5/1986 | Howey | .................... | 206/308.3 |
| 4,610,352 A * | 9/1986 | Howey et al. | .............. | 206/313 |
| 4,736,840 A * | 4/1988 | Deiglmeier | .............. | 206/308.1 |
| 4,850,731 A * | 7/1989 | Youngs | ................... | 206/308.1 |
| 4,874,085 A * | 10/1989 | Grobecker et al. | ...... | 206/308.1 |
| 5,119,362 A * | 6/1992 | Yanagisawa | ................ | 720/708 |
| 5,299,186 A * | 3/1994 | Tsurushima | .............. | 206/308.1 |
| 5,462,160 A * | 10/1995 | Youngs | ................... | 206/308.1 |
| 5,538,774 A * | 7/1996 | Landin et al. | .............. | 369/288 |
| 5,556,683 A * | 9/1996 | Ranalli | ........................ | 428/68 |
| 5,588,527 A * | 12/1996 | Youngs | ................... | 206/308.1 |
| 5,829,583 A * | 11/1998 | VerWeyst et al. | ........ | 206/308.1 |
| 6,123,191 A * | 9/2000 | Dean | ........................ | 206/308.1 |
| 6,157,605 A * | 12/2000 | Mori | ......................... | 720/648 |
| 6,186,320 B1* | 2/2001 | Drew | ........................ | 206/308.1 |
| 6,252,843 B1* | 6/2001 | Begley et al. | .............. | 720/708 |
| 6,276,523 B2* | 8/2001 | Sanders | .................... | 206/308.1 |
| 2003/0042155 A1* | 3/2003 | Darby | ........................ | 206/308.1 |
| 2004/0262176 A1* | 12/2004 | King | ........................ | 206/308.1 |
| 2005/0098454 A1* | 5/2005 | Gallant et al. | ........... | 206/308.1 |

* cited by examiner

Primary Examiner—William Korzuch
Assistant Examiner—Nathan Danielsen

(57) ABSTRACT

A substantially circular disc of Totally Stable® 2095, wet laid, water based processed, cut away, 3.0 ounce, 0.018 to 0.040 inches, 18 to 40 mils thick, non-woven, 85% Acrylic Latex Polyester and 15% cellulose wood pulp fabric backing material and a substantially circular, releasably attached, spindle adaptor ring is disclosed for protecting laser discs outside of a laser disc drive or container. The spindle adaptor ring holds a fabric protective disc on a laser disc and thereby covering and protecting a laser disc when it is outside of a laser disc drive and container.

2 Claims, 3 Drawing Sheets

PROTECTIVE DIVIDER AND ENCLOSURE DISC ASSEMBLY FOR LASER DISCS AND LASER DISC DRIVES

This is a continuation-in-part of application Ser. No. 09/909,087, filed Jul. 20, 2001, now abandoned.

BACKGROUND OF THE INVENTION

There is an urgent need for separating and protecting laser discs from contacting each other and thereby scratching the recorded or blank audio and optical portions of a laser disc. There is no other protective disc in the prior art that meets this need. All laser disc care products in the prior art depend on Polyester®, Rayon® and Nylon® spunbound tack welded or bonded materials. Polyester and Rayon fabric is used in computer floppy disc envelopes as noted in U.S. Pat. Nos. 4,586,606 and 4,413,298. In U.S. Pat. No. 5,588,527 for CD storage, Polyester fabric material is considered softer than cellulosic fibers such as cotton fabric material. The tack welded or bonded Polyester and Rayon fabric of the prior art is not soft in equal directions. The tack welded or bonded Polyester and Rayon fabric material is abrasive to CD's and DVD's. U.S. Pat. Nos. 4,850,731 and 5,462,160 continue the use of Polyester. U.S. Pat. No. 4,610,352 realized cellulosic fibers compressed and thermally bonded together in a plurality of recessed discrete bonding points comprised of Nylon 6 Polycaprolactam® fiber with Rayon cellulosic fiber. U.S. Pat. No. 4,520,470 is a rotating laser disc cleaning device. This cleaning device uses natural or synthetic cleaning materials of velvet, cotton, and a brush.

U.S. Pat. No. 5,538,774 is a rotating storage article that allows data to be stored on the article to allow reading or writing of information from the article. Many combinations of vibration damping materials are used. The rotating storage article is not a protective disc and the 2095 Totally Stable® fabric material used in the applicant's invention is not included. U.S. Pat. No. 6,186,32081 is a double-sided storage sleeve for holding CD's and DVDs in a pocket. Comprised of Veralco® Polypropylene® in layers, tack welded or bonded together. This double-sided storage sleeve comprises a plurality of apertures positioned for removable interconnection to a notebook binder. The double-sided sleeve is not a protective disc, it is square and it cannot be placed between CD's and DVD's inside a spindle container. The edges of the backing material used in the prior art are tack welded or bonded. This tack welded or bonded area is not soft in equal directions. This tack welded or bonded area scratches CD's and DVDs and can not be used to clean a CD or DVD. The fabric protective disc of this invention is comprised of 2095 Totally Stable® wet laid, water based processed, cut away, 3.0 ounce, non-woven, 85% Acrylic Latex Polyester and 15% cellulose wood pulp fabric backing material with a thickness of 0.018 to 0.040 inches. The fabric protective disc is soft in equal directions and can be used to clean a CD and DVD. The fabric protective disc has a centrally located aperture allowing the fabric protective disc to be placed between each CD and DVD in a spindle container.

The applicant first started his work on U.S. Pat. No. 3,854,729 The Record Divider and Preservative. When laser discs were first introduced they were made of Du Pont Mylar® and scratches did not affect them. Now laser discs are made of G.E., Lexan® and scratches do affect them. The applicant of this invention has researched many fabrics to find strong material properties to be soft on laser discs. The fabric protective disc of this invention is all that is needed for the protection of laser discs outside of a laser disc drive and inside or outside of a laser disc case. Totally Stable® 2095 wet laid, water based processed, cut away, 3.0 ounce, non-woven, 85% acrylic latex polyester and 15% cellulose wood pulp fabric backing material with a thickness of 0.018 to 0.040 inches, is soft in equal directions and can be used to clean a laser disc wet or dry, never scratching a laser disc. Totally Stable 2095® backing material is resilient, it will return to its original shape after being compressed, folded or bent. The tear away spun bound, tack welded material of the prior art will leave permanent crease marks after being compressed, folded or bent. The tear away spun bound, tack welded material is not soft in equal directions and cannot be used to clean a laser disc. Thinner Pelon® fabric material will also scratch laser discs.

The fabric protective disc of the applicant's invention further includes a removable and a permanently fastened spindle adaptor ring for use outside of a laser disc drive or container. The spindle adaptor ring releasably attaches the fabric protective disc to a laser disc by the use of a press fit spindle.

As will be seen from the foregoing drawings and description, this invention further includes a protective enclosure disc for laser discs inside and outside a laser disc drive. This protective enclosure disc covers a laser disc protecting both sides from scratches and dirt. The protective enclosure disc is made of clear Du Pont, Mylar® or General Electric, Lexan® plastic material with a thickness of 0.010 to 0.020 inches. The fabric protective disc is used with each protective enclosure disc outside of a laser disc drive to protect the outer surfaces of the enclosure disc.

The known prior art relating to protective discs for laser discs includes the following U.S. Pat. Nos. 4,413,298, 5,588,527; 4,850,731; 5,462,160; 4,610,352; 4,520,470; 3,854,729; 4,586,606; 4,276,636; 1,683,440 and 4,316,281.

SUMMARY OF THE INVENTION

The invention comprises a fabric protective disc designated by reference number 40 to be inserted between laser discs and enclosure discs to prevent laser discs from contacting each other. Disc 40 comprises 2095 Totally Stable® wet laid, water based processed, non-woven, cut away fabric backing material, 85% Latex Polyester, 15% cellulose wood pulp material, weighing 3.0 ounce, designated by reference number 24 having a thickness of 0.018 to 0.040 inches. Disc 40, comprises a circular, centrally located aperture 25 the same size to as the aperture in a laser disc, having an outermost peripheral edge 26 with a diameter substantially the same size diameter of as a laser disc.

Disc 40 further includes a removable and a permanently fastened spindle adaptor ring 10. Ring 10 has a body portion 20 of any material with requisite strength and thickness. Body portion 20 has an outermost peripheral edge 21 with a centrally located spindle 22 having an outermost peripheral edge 23. Spindle 22 is the requisite size to be press fit into the aperture 25 of fabric disc 40 and the aperture 91 of laser disc 90, releasably attaching fabric disc 40 to disc 90.

Further means of attachment of fabric protective disc 40 to laser disc 90 includes the use of a round channel 200 located at the top end of spindle 22 in spindle adaptor ring 10. Spindle 22 is higher than the level of laser disc 90. A spring 100 is located in the middle with a detent ball 101 press fit into channel end 201 and a detent ball 102 press fit into the opposite channel end 202. Each detent ball extends halfway out of channel 200. Spindle 22 is inserted into aperture 25 of fabric disc 40 and aperture 91 of laser disc 90. Each detent ball holds the top peripheral edge of aperture 91 in laser disc 90 releasably attaching ring 10 and fabric disc 40 to laser disc 90. As will be seen, this invention further includes a protective enclosure disc, represented by reference numeral 50. Disc 50 is comprised of Du Pont, Mylar® or General Electric, Lexan® material with a thickness of 0.010 to 0.020 inches. Disc 50 has an outermost peripheral edge 54 and an innermost peripheral beveled edge 55 to surround the outermost peripheral edge of a laser disc. Aperture 61 of disc 50 and aperture 72 of enclosure disc cover 60 are larger than the aperture in a laser disc. A laser disc is placed inside disc 50 and the enclosure disc cover 60 is placed on top of a laser disc fitting in a tight relationship. Enclosure disc covers 60 extends under the inside peripheral beveled edge 55 in a close abutting relationship enclosing a laser disc inside a removable protective enclosure.

DETAILED DESCRIPTION OF THE INVENTION

Figure 1:
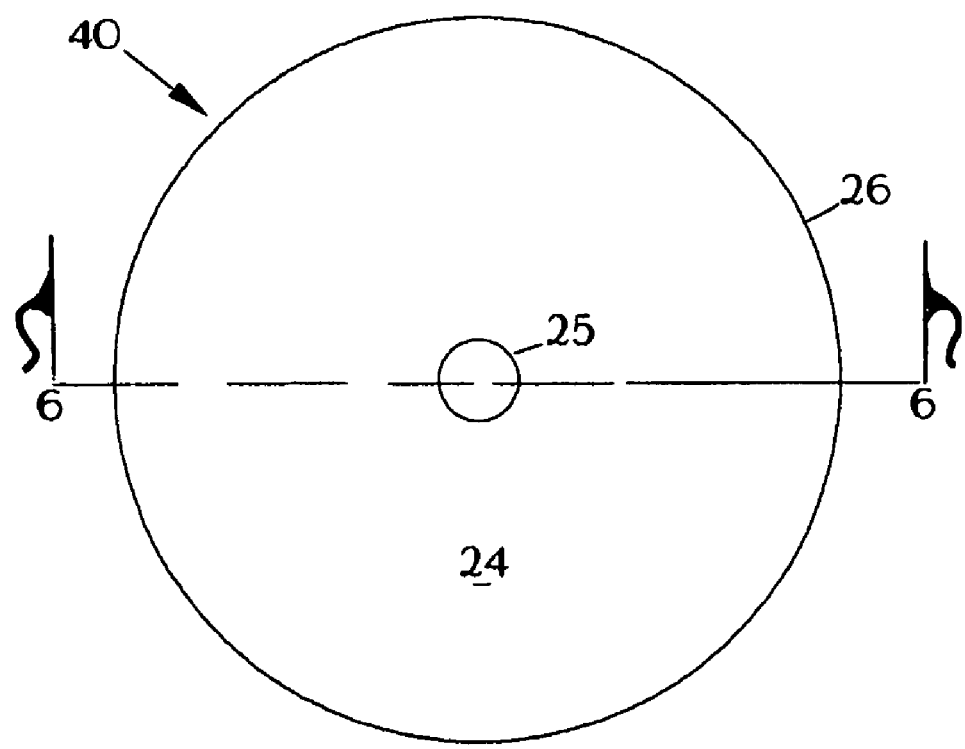
FIG. 1 is a plan view of the fabric protective disc.

Referring to the drawings in this case and particularly to FIG. 1, the invention includes a substantially circular or annular fabric protective disc generally designated by reference numeral 40. Disc 40 is placed between laser discs and enclosure discs outside of a laser disc drive, thereby protecting the audio and optical portion of a laser disc and the surfaces of enclosure discs, from being scratched and damaged.

The disc in its preferred embodiment is seen in FIG. 1 wherein disc 40 comprises sheet stock-material 24 of Totally Stable® 2095® wet laid, water based processed, non-woven, cut away fabric backing material, 85% Acrylic Latex Polyester and 15% cellulose wood pulp material, weighing 3.0 ounces, having a thickness of between 0.018 to 0.040 inches. As seen in the preferred embodiment, fabric protective disc 40 has a centrally located aperture 25 measuring the same as the aperture in a laser disc with an outermost peripheral edge generally designated by reference numeral 26, having the same size diameter as a laser disc.

Figure 2:
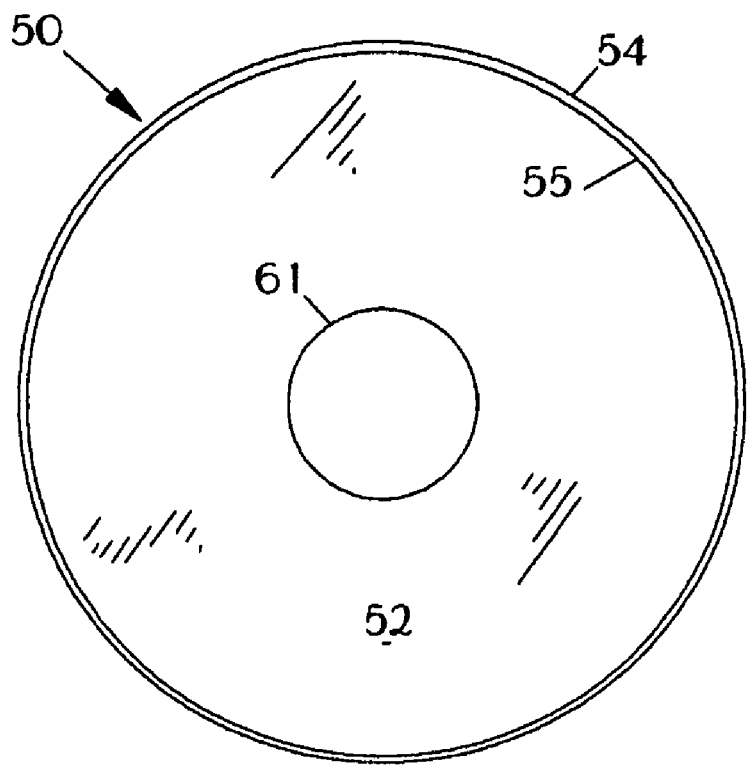
FIG. 2 is a top plan view of the enclosure disc

Referring to FIG. 2, it may be seen that the enclosure disc designated by reference numeral 50, comprises a substantially circular or annular disc, having a centrally located aperture 61. Aperture 61 is larger than the aperture of a laser disc to avoid any interference with the laser disc drive. The enclosure disc 50 comprises a body portion 52 made of clear plastic Du Pont, Mylar® or General Electric, Lexan® material with a thickness of 0.010 to 0.020 inches with an outermost peripheral edge 54 and inner most peripheral beveled edge 55 to surround and hold the outermost peripheral edge of a laser disc.

Figure 3:
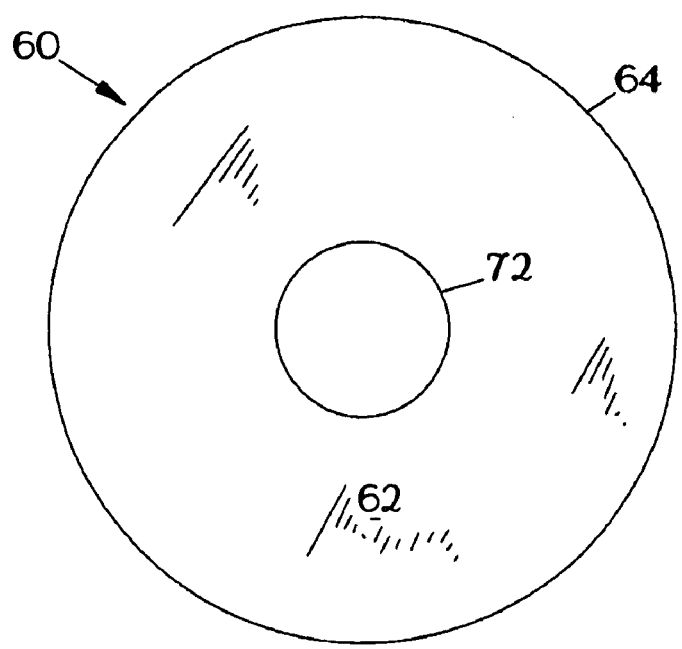
FIG. 3 is a plan view of the enclosure disc cover.

As shown in FIG. 3, the enclosure disc cover designated by reference numeral 60 comprises a centrally located aperture 72 larger than the aperture in a laser disc to avoid any interference with a laser disc drive. Disc 60 comprises a body portion 62 made of clear plastic Du Pont, Mylar® or General Electric, Lexan® material with a thickness of 0.010 to 0.020 inches and an outermost peripheral edge 64 having a diameter measuring slightly smaller than the diameter of a laser disc.

Figure 4:
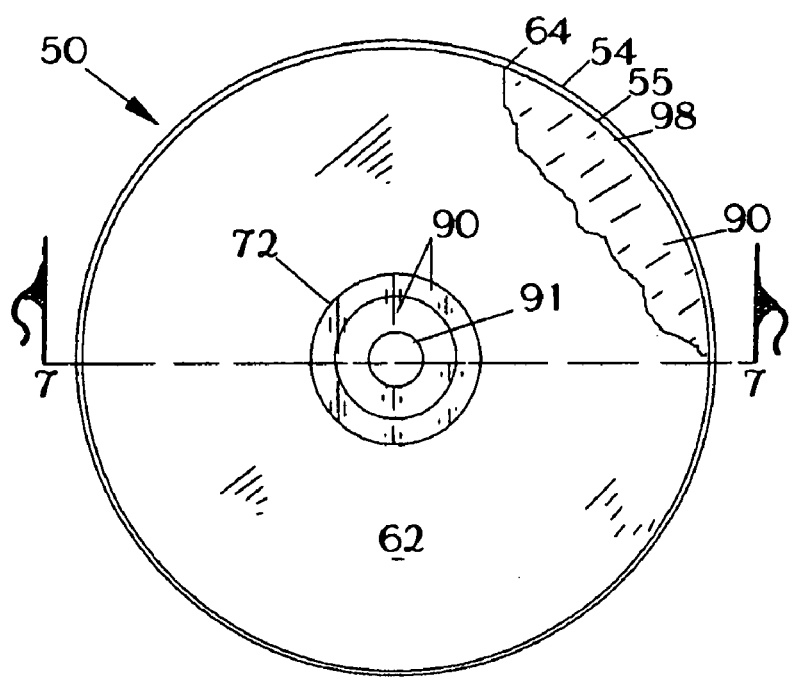
FIG. 4 is a top fragmented view of the enclosure disc showing a laser disc enclosed inside the enclosure disc and cover.

As shown in FIG. 4, enclosure disc 50 is holding laser disc 90 in a tight, abutting, relationship. The outermost peripheral edge 54 and the inner most peripheral beveled edge 55 of disc 50 surrounds the outermost peripheral edge 98 of laser disc 90. The outermost peripheral edge 64 of the enclosure disc cover 60 measures slightly smaller than the diameter of a laser disc to compensate for the abutting relationship with the inner most peripheral beveled edge 55 and the outermost peripheral edge 54 of enclosure disc 50.

Enclosure disc cover 60 is placed on top of laser disc 90. The center aperture 91 of laser disc 90 and the center aperture 72 of the enclosure disc cover 60 have the same central axis and in effect form two concentric circles. Aperture 61 of enclosure disc 50 and aperture 72 of enclosure disc cover 60 have a larger diameter than center aperture 91 of laser disc 90. Enclosure disc cover 60 extends radially outward from the center aperture 72 to the outermost peripheral edge 64. The outermost peripheral edge 64 of the enclosure disc cover 60 extends close to the outermost peripheral edge 98 of laser disc 90 and under the inner most peripheral beveled edge 55 of enclosure disc 50, in a removable protective enclosure.

Figure 5:
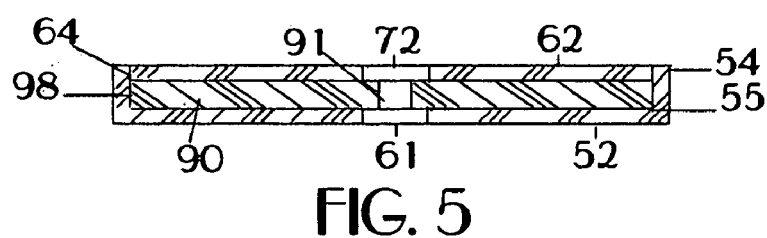
FIG. 5 is a cross-sectional view taken on line 7-7 of FIG. 4 showing the enclosure disc on the bottom, a laser disc in the middle and the enclosure disc cover on top.

As shown in FIG. 5, laser disc 90 is enclosed by enclosure disc 50 and enclosure disc cover 60. Enclosure disc area 52 extends radially outward from the center aperture 61 to the outermost peripheral edge 54 and the inner most peripheral beveled edge 55. The center aperture 61 of enclosure disc 50 and the center aperture 72 of enclosure disc cover 60 measure approximately 1½% inches in diameter, larger than aperture 91 in laser disc 90. The outermost peripheral edge 54 and the inner most peripheral beveled edge 55 surround the outermost peripheral edge 98 of laser disc 90.

The outermost peripheral edge 64 of enclosure disc cover 60 extends close to the outermost peripheral edge 98 of laser disc 90 and under the inner most peripheral beveled edge 55 of enclosure disc 50. The clear plastic Mylar® or Lexan® material of enclosure disc 50 and enclosure disc cover 60 covers the laser disc in a removable protective enclosure.

Figure 6:
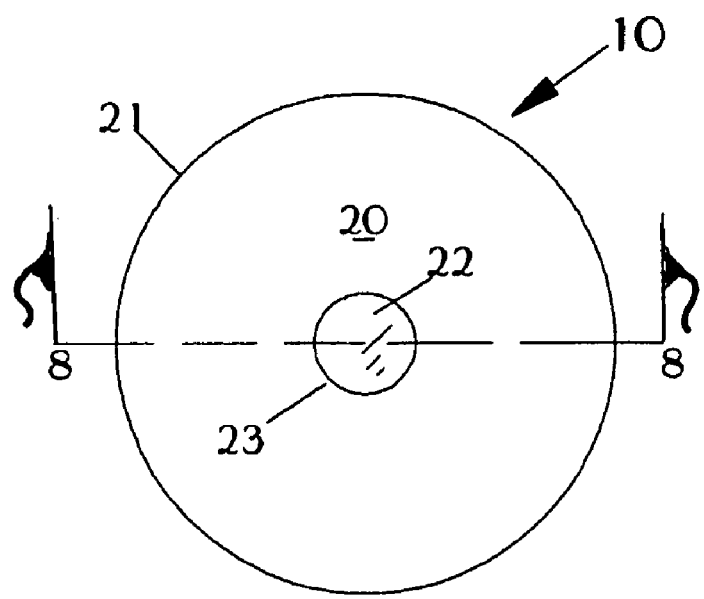
FIG. 6 is a plan view of the spindle adaptor ring.

The spindle adaptor ring in its preferred embodiment is seen in FIG. 6, wherein ring 10 comprises a body portion 20 comprised of any material with requisite strength and thickness, measuring approximately 2 inches in diameter, having an outer most peripheral edge 21 and a centrally located spindle 22 with an outer most peripheral edge 23. Spindle 22 has the requisite length to be press fit into the aperture in the fabric protective disc and the aperture in a laser disc, releasably attaching a fabric protective disc to a laser disc.

Figure 7:
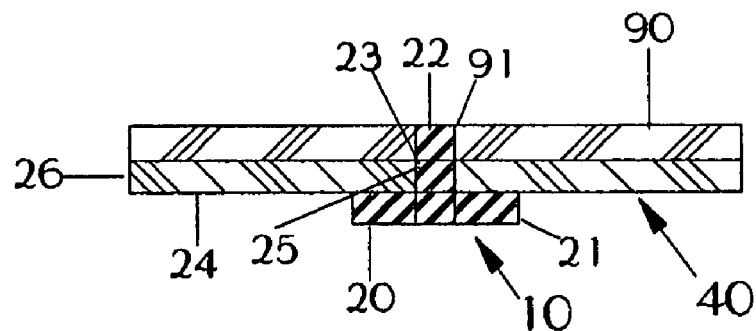
FIG. 7 is a cross-sectional view taken on line 8-8 of FIG. 6 showing the spindle adaptor ring on the bottom with the spindle inserted into the aperture of the fabric protective disc in the middle and the aperture of the laser disc on top.

FIG. 7 is a cross-sectional view taken on line 8-8 of FIG. 6 and line 6-6 of FIG. 1 displaying the spindle adaptor ring 10 on the bottom with the spindle 22 of the spindle adaptor ring 10 press fit inside aperture 25 of fabric protective disc 40 in the middle and aperture 91 of a laser disc 90 on top.

Figure 8:
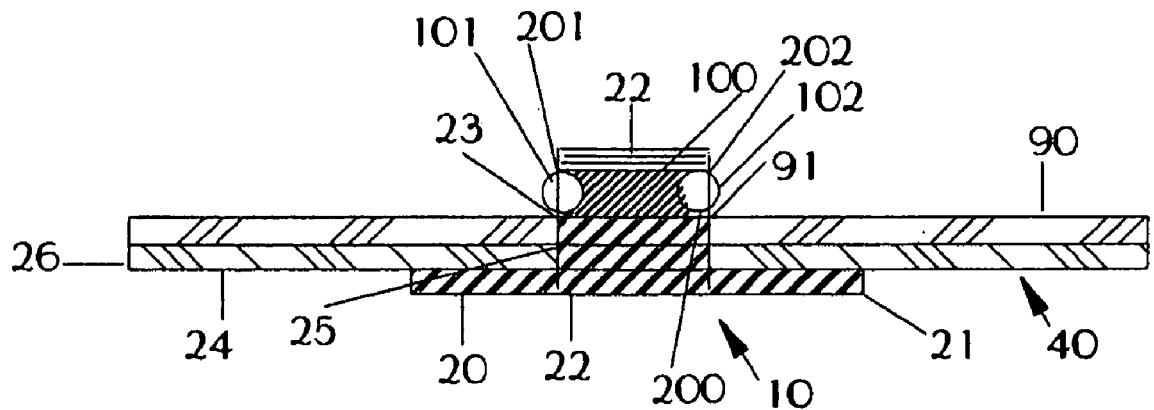
FIG. 8 is a cross-sectional view taken on line 6-6 of FIG. 1 showing two detent balls and a spring inside the spindle adaptor ring releasably attached to the periphery of the aperture in a laser disc on top with the fabric protective disc in the middle and the spindle adaptor ring on the bottom with the spindle inserted into the aperture of the fabric protective disc in the middle and the aperture of a laser disc on top.

FIG. 8 is a cross-sectional view taken on line 6-6 of FIG. 1, showing spindle 22 of spindle adaptor ring 10 releasably attached to aperture 25 of fabric disc 40 and aperture 91 of laser disc 90. Body portion 20 of ring 10 is removable or permanently fastened to the center of disc 40. The top end of spindle 22 and outer most peripheral edge 23 is higher than the level of laser disc 90. The top end of spindle 22 contains a round channel 200 with a plastic or metal spring 100 in the middle and a plastic or metal detent ball 101 press fit into channel end 201 abutting spring 100 and a plastic or metal detent ball 102 press fit into the opposite end of channel end 202 abutting the opposite end of spring 100. Each detent ball extends halfway out of each channel end 20 land 202 of channel 200. Each detent ball holds the top peripheral edge of aperture 91 in laser disc 90 on each side when spindle 22 is inserted into aperture 25 of fabric disc 40 and aperture 91 of laser disc 90, releasably attaching ring 10 and disc 40 to laser disc 90.

I claim:

1. A laser disc protection device, comprising:

a fabric protective divider disc made of wet laid, water based processed, cut away, 3.0 ounce, non-woven, 85% Acrylic Latex Polyester and 15% cellulose wood pulp fabric backing material having a thickness of between 0.018 to 0.040 inches, an outer diameter substantially the same as an outer diameter of a laser disc to be protected, and a centrally-located aperture with a diameter substantially the same as a diameter of an aperture of the laser disc to be protected;

an annular spindle adaptor ring;

a spindle having a top end located higher than a top surface of the laser disc to be protected and which is permanently attached to and extends perpendicularly from the center of the annular spindle adaptor ring, and is simultaneously press fit into the aperture of the fabric protective divider disc and the aperture of the laser disc to be protected, in a close juxtaposition relationship therewith; and a round channel located in the top end of the spindle, which extends in the diameter direction of the spindle and has two ends;

a detent ball made of metal or plastic press fit into each end of the round channel; and a spring made of metal or plastic located in the round channel between each of the detent balls, wherein the spring urges each detent ball to extend out of the round channel to thereby hold an inner peripheral edge of the aperture of the laser disc to be protected and allow the spindle and the annular spindle adaptor ring to releasably attach and hold the laser disc to be protected in simultaneous contact with the fabric protective divider disc and the annular spindle adaptor ring.

2. The laser disc protection device as set forth in claim 1, further comprising permanent adhesive to attach the annular spindle adaptor ring to the fabric protective divider disc.

* * * * *